United States Patent
Tamai et al.

(10) Patent No.: US 7,220,217 B2
(45) Date of Patent: May 22, 2007

(54) ENGINE SPIN-UP CONTROL WITH NATURAL TORQUE SMOOTHING

(75) Inventors: Goro Tamai, West Bloomfield, MI (US); Tony T. Hoang, Warren, MI (US)

(73) Assignee: General Motors Corporation, Detroit, MI (US)

( * ) Notice: Subject to any disclaimer, the term of this patent is extended or adjusted under 35 U.S.C. 154(b) by 185 days.

(21) Appl. No.: 11/043,274

(22) Filed: Jan. 26, 2005

(65) Prior Publication Data

US 2006/0166783 A1     Jul. 27, 2006

(51) Int. Cl.
*B60W 10/04* (2006.01)

(52) U.S. Cl. ..................................... 477/183

(58) Field of Classification Search ................ 477/203, 477/187, 183; 123/179.3, 179.4
See application file for complete search history.

(56) References Cited

U.S. PATENT DOCUMENTS

| | | | | |
|---|---|---|---|---|
| 6,135,920 | A  * | 10/2000 | Kamiya et al. | 477/185 |
| 6,253,127 | B1 * | 6/2001  | Itoyama et al. | 701/22 |
| 6,469,402 | B2 * | 10/2002 | Morimoto et al. | 290/40 C |
| 6,612,386 | B2 * | 9/2003  | Tamai et al. | 180/65.4 |
| 6,616,569 | B2 * | 9/2003  | Hoang et al. | 477/3 |
| 6,945,905 | B2 * | 9/2005  | Tamai et al. | 477/3 |
| 7,031,826 | B2 * | 4/2006  | Flick | 701/113 |
| 7,061,130 | B1 * | 6/2006  | Blackburn et al. | 290/31 |

* cited by examiner

*Primary Examiner*—Dirk Wright
(74) *Attorney, Agent, or Firm*—Christopher DeVries

(57) ABSTRACT

A hybrid vehicle includes an engine having at least one cylinder and an electric machine that drives the engine during a start-up period. A control module monitors a rotational speed of the engine and regulates torque generated by the electric machine based on the rotational speed during the start-up period and a maximum discharge power available to power the electric machine.

26 Claims, 4 Drawing Sheets

ENGINE SPIN-UP CONTROL WITH NATURAL TORQUE SMOOTHING

FIELD OF THE INVENTION

The present invention relates to hybrid vehicles, and more particularly to a torque smoothing control system of a hybrid vehicle.

BACKGROUND OF THE INVENTION

Hybrid vehicles are driven by multiple powerplants including, but not limited to an internal combustion engine and an electric machine. The electric machine functions as a motor/generator. In a generator mode, the electric machine is driven by the engine to generate electrical energy used to power electrical loads or charge batteries. In a motor mode, the electric machine supplements the engine, providing drive torque to drive the vehicle drivetrain.

When the hybrid vehicle is at rest and no drive torque is required, the engine is deactivated. Vehicle launch is initiated by the operator in one of several manners including, but not limited to, depressing an accelerator pedal and releasing pressure from a brake pedal. Prior to activating the engine, the electric machine spins up or drives the engine to a desired idle speed. As the engine spins up to idle speed, compression torque induces speed sag. This causes resonance within the powertrain, which can be sensed by the operator.

SUMMARY OF THE INVENTION

Accordingly, the present invention provides a hybrid vehicle that includes an engine having at least one cylinder and an electric machine that drives the engine during a start-up period. A control module monitors a rotational speed of the engine and regulates torque generated by the electric machine based on the rotational speed during the start-up period and a maximum discharge power from an energy storage device to power the electric machine.

In other features, the hybrid vehicle further includes a driver input device. The control module determines the maximum discharge power based on the driver input device. The control module determines a start-up schedule based on the driver input device and determines the maximum discharge power based on the start-up schedule. The start-up schedule includes a torque command and the maximum discharge power.

In other features, the driver input device includes an accelerator pedal. The control module determines a start-up schedule based on a position of the accelerator pedal.

In still other features, the driver input device includes a brake pedal. The control module determines a start-up schedule based on a position of the brake pedal and/or a pressure within the brake system.

In yet another feature, the control module regulates the rotational speed based upon a desired idle speed when the rotational speed achieves a speed threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
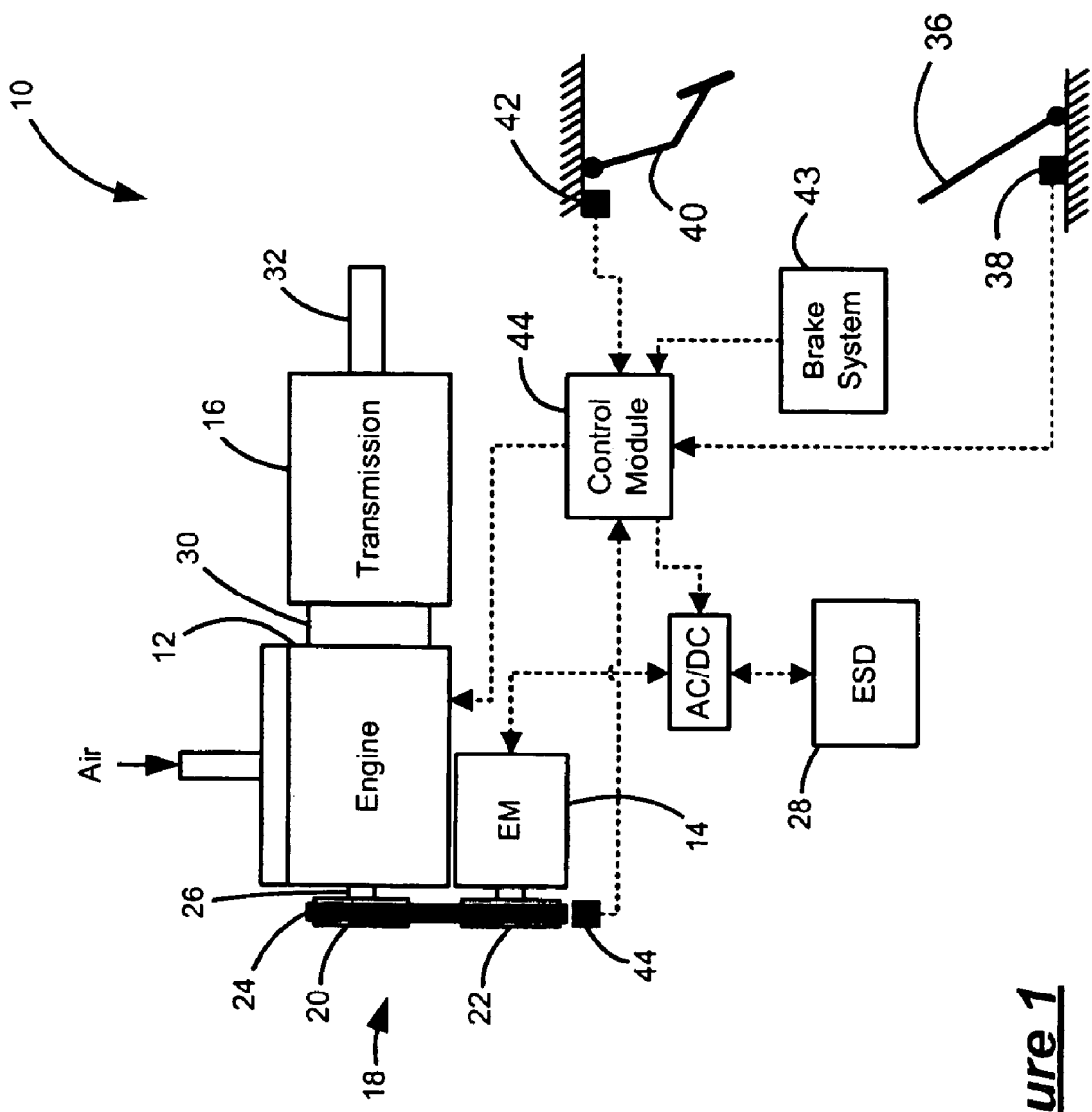
FIG. 1 is a schematic illustration of an exemplary hybrid vehicle that is operated based on a launch control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary hybrid vehicle 10 includes an engine 12 and an electric machine 14, which drive a transmission 16. More specifically, the electric machine 14 supplements the engine 12 to produce drive torque to drive the transmission 16. In this manner, fuel efficiency is increased and emissions are reduced. The engine 12 and electric machine 14 are coupled via a belt-alternator-starter (BAS) system 18. More specifically, the electric machine 14 operates as a starter (i.e., motor) and an alternator (i.e., generator) and is coupled to the engine 12 through a belt and pulley system. The engine 12 and the electric machine 14 include pulleys 20,22, respectively, that are coupled for rotation by a belt 24. The pulley 20 is coupled for rotation with a crankshaft 26 of the engine 12. In one mode, the engine 12 drives the electric machine 14 to generate power used to recharge an energy storage device (ESD) 28. In another mode, the electric machine 14 drives the engine 12 using energy from the ESD 28. The ESD 28 can include, but is not limited to, a battery or a supercapacitor. Alternatively, the BAS system 18 can be replaced with a flywheel-alternator-starter (FAS) system (not shown), which includes an electric machine operably disposed between the engine and the transmission or a chain or gear system that is implemented between the electric machine 14 and the crankshaft 26.

The transmission 16 can include, but is not limited to, a manual transmission, an automatic transmission, a continuously variable transmission (CVT) and an automated manual transmission (AMT). Drive torque is transferred from the engine crankshaft 26 to the transmission 16 through a coupling device 30. The coupling device 30 can include, but is not limited to, a friction clutch or a torque converter depending upon the type of transmission implemented. The transmission 16 multiplies the drive torque through one of a plurality of gear ratios to drive a driveshaft 32.

A control module 34 regulates operation of the vehicle 10 based on the launch control system of the present invention. The control module 34 controls fuel injection and spark to selectively activate and deactivate cylinders of the engine 12. More specifically, when the vehicle 10 is at rest, none of the cylinders of the engine 12 are firing (i.e., are deactivated) and the engine 12 is stopped. During vehicle launch (i.e., acceleration from rest), the electric machine 14 drives the crankshaft to spin-up the engine 12 to an idle RPM and to initiate vehicle acceleration. During periods where low drive torque is needed to drive the vehicle, the engine cylinders do not fire and the valves can be deactivated. Drive torque is provided by the electric machine 14. When deactivated, fuel and spark are cut-off to the cylinders of the engine. Further, opening and closing cycles of the intake and exhaust valves can be prevented to inhibit air flow processing with the cylinders.

An accelerator pedal 36 is provided. A pedal position sensor 36 is sensitive to a position of the accelerator pedal 36 and generates a pedal position signal based thereon. A brake pedal 40 is provided. A brake pedal position sensor 42 is sensitive to a position of the brake pedal 40 and generates a pedal position signal based thereon. The control module 34 operates a brake system 43 based on the brake pedal position signal to adjust a pressure within the brake system, which in turn regulates a braking force of brakes (not shown). A speed sensor 44 is responsive to the rotational speed ($RPM_{EM}$) of the electric machine 44. The speed sensor 44 generates a speed signal. The control module 34 operates the vehicle 10 based on the pedal position signals generated by the pedal position sensors 38,42 and the speed signal generated by the speed sensor 44, as described in further detail below. The engine speed ($RPM_{ENG}$) can be determined based on the speed signal. More specifically, $RPM_{EM}$ can be multiplied by the known pulley ratio to provide $RPM_{ENG}$.

When deactivated, fuel and spark (i.e., ignition) are cut-off to cylinders of the engine 12. Vehicle launch is initiated based on operator input. For example, vehicle launch can be initiated by an operator depressing the accelerator pedal 36 or relieving pressure from the brake pedal 40. Each of these actions indicate an operator's desire to initiate vehicle movement. The vehicle launch control system of the present invention implements the electric machine 14 to spin-up the engine 12 to a desired idle speed, prior to firing (i.e., activating) the engine 12.

The vehicle launch control system determines a start-up schedule based upon the manner in which vehicle launch is initiated by the operator. The start-up schedule defines the parameters, at which the electric motor 14 is operated to spin-up the engine 12 to the desired idle speed. For example, in the case where the operator initiates vehicle launch by depressing the accelerator pedal, an aggressive launch is indicated. Therefore, the start-up schedule is chosen to enable a rapid engine spin-up. In the case where the operator initiates vehicle launch by relieving pressure from the brake pedal, a relaxed launch is indicated. Therefore, the start-up schedule is chosen to enable a less rapid engine spin-up. It is also anticipated that the start-up schedule can be determined based on the pressure within the brake system 43. A plurality of alternative start-up schedules can be implemented to handle other cases, such as an operator depressing the accelerator pedal while maintaining pressure on the brake pedal.

In one routine, the launch control system provides passive torque smoothing. More specifically, the launch control system determines a desired start-up schedule based on the driver input. The start-up schedules each define operating parameters including, but not limited to, operation mode, torque command, torque slew rate, maximum discharge power ($P_{MAX}$) and minimum battery voltage ($V_{MIN}$). The operation mode includes a torque control mode, which indicates that the control module 34 is to regulate operation of the electric machine 14 based on torque, as opposed to speed. The torque command is set to a torque value that is higher than that which the system can deliver or some high value dictated by the physical constraints of the system (e.g., bearing loads). The torque slew rate defines the rate at which torque change occurs (e.g., Nm/sec). $P_{MAX}$ is the maximum power that is to be discharged from the ESD 28 to drive the electric machine 14 and $V_{MIN}$ is the minimum voltage that the ESD 28 is allowed to achieve.

The torque command is intentionally set higher than that which is achievable in order to limit the torque output of the electric machine 14 based on $V_{MIN}$ and $P_{MAX}$. The parameters of the start-up schedules vary based on the driver input. More specifically, $P_{MAX}$ varies based on the desired aggressiveness of the launch. For example, in the case of a more aggressive vehicle launch, $P_{MAX}$ is higher than that of a less aggressive launch.

Once the start-up schedule has been selected, the control module 34 drives the electric machine 14, which drives the engine 12. As the rotational speeds of the engine 12 and electric machine 14 increase, a point is achieved where air compression within the cylinders slows the rotational speed. Upon detecting a decrease in rotational speed, the launch control system increases the torque generated by the electric machine 14 to inhibit undesired speed sagging and powertrain resonance. Upon achieving a desired rotational speed, the launch control system switches from the torque control mode to a speed control mode, whereby the speed of the electric machine 14 is profiled to gently raise the engine speed to blend with the slight speed increase of the following fuel delivery.

Figure 2:
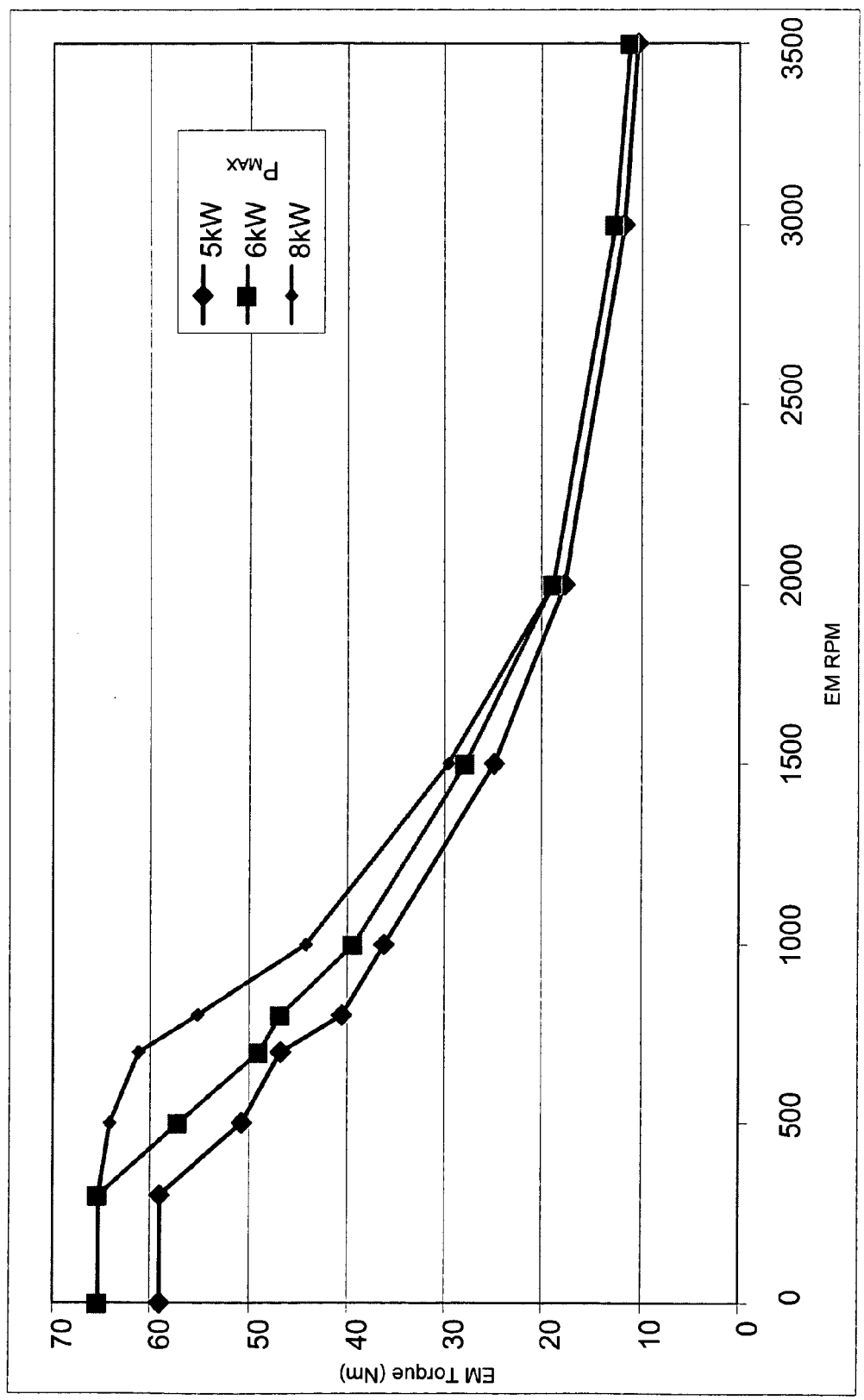
FIG. 2 is a graph illustrating electric machine torque versus speed for multiple power levels.

As graphically illustrated in FIG. 2, the electric machine 14 is capable of producing more torque for a given $P_{MAX}$ and torque command, which is set arbitrarily high. More specifically, for a given $P_{MAX}$, the torque capability decreases as $RPM_{EM}$ increases. Also, the torque envelope is greater as $P_{MAX}$ is increased, but not for all $RPM_{EM}$'s. For example, based on the exemplary values of FIG. 2, there is no advantage in drawing more battery power than 6 kW when $RPM_{EM}$ is less than approximately 400 RPM since the system is already saturated. However, above 400 RPM, increasing $P_{MAX}$ yields more mechanical output.

Figure 3:
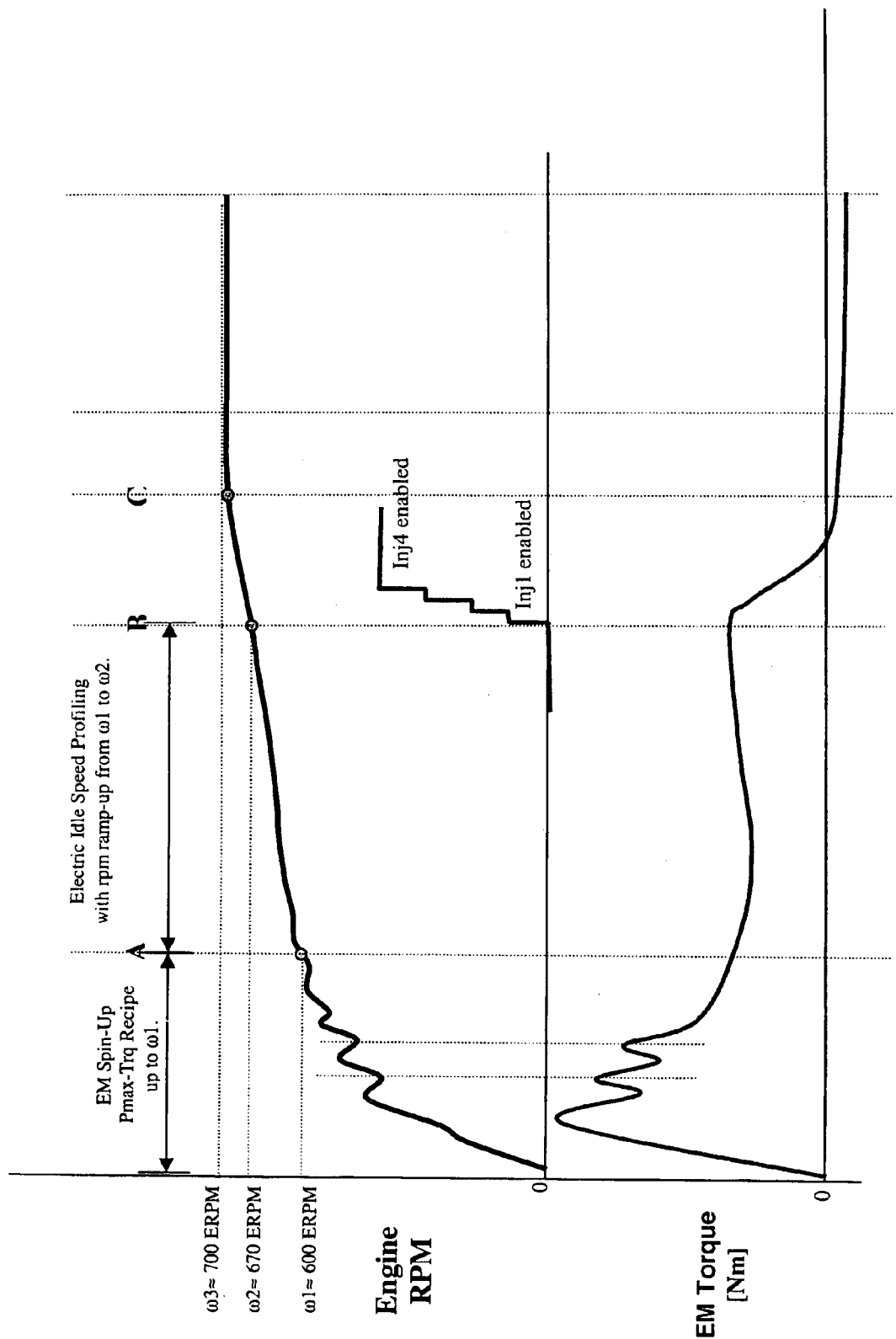
FIG. 3 is a graph illustrating engine speed and electric machine (EM) torque during vehicle launch.

Referring now to FIG. 3, exemplary values of electric machine speed and torque are provided for an exemplary launch. The mechanical resonance of the exemplary vehicle occurs at approximately 300 RPM. Therefore, the launch control system functions to pass through the 200–400 RPM region as quickly as possible. During this region, the electric machine torque is naturally boosted as the RPM sags due to compression torque. This is because more electric machine torque is becomes available as the RPM sags for a given discharge power. Assuming the target engine idle speed is 700 RPM, once the engine has reached approximately 600 RPM, the operation mode is set to the speed control mode. The speed to which the electric motor controls the rotational speed of the engine can be profiled from 600 to 670 RPM. In this manner, stitching the electric creep and the refueling or cylinder activation (e.g., fueled creep or accelerator tip-in) modes together more seamlessly.

The initial $P_{MAX}$ is not necessarily set to max power output (e.g., >6 kW). In this manner, vehicle jerk is suppressed when the engine 12 is accelerated from 0 to a finite RPM. The torque must also transition smoothly from the compression torque smoothing phase to the constant-speed phase (e.g., approximately 250 ms in FIG. 3). In this manner, vehicle jerk is suppressed when the engine 12 stops accelerating. In addition, the engine crankshaft 26 is pre-positioned before the engine spin-up to minimize the torque required to accelerate the engine 12.

The power command calibrations can be tabulated as a function of engine coolant temperature. The launch control system can also boost $P_{MAX}$ if a certain engine RPM is not observed after a predicted time (e.g., a "crank stuck" scenario). The calibrations are also affected by the tuning of the powertrain mounts. It is desirable to ensure that the remaining compression beating frequencies (150–250 ms in FIG. 3) are as far as practical from the natural pitch mode frequency of the powertrain mounts. The same idea applies to the accessory drive tuning as well.

In an alternative routine, the launch control system regulates the electric machine 14 based on differential gains for negative electric machine RPM derivatives. In this case, each start-up schedule defines operating parameters including, but not limited to, operation mode, torque slew rate, a maximum discharge power for a first positive range ($P_{MAXPOS1}$), a maximum discharge power for a second positive range ($P_{MAXPOS2}$), a maximum discharge power for a negative range ($P_{MAXNEG}$) and minimum battery voltage ($V_{MIN}$). For example, $P_{MAXPOS1}$ can be set to 5.7 kW during positive acceleration for speeds under 500 RPM. $P_{MAXPOS2}$ can be set to 6.5 kW during positive acceleration for speed greater than or equal to 500 RPM. $P_{MAXNEG}$ can be set to 7.5 kW during zero or negative acceleration for speeds greater than 500 RPM or any speed for greater than or equal to 100 ms after spin-up start. It is appreciated that these values are merely exemplary in nature.

The control module 34 monitors the electric machine 14 speed and acceleration and has the capability to set separate $P_{MAX}$ values for positive and negative motor accelerations. Similar to the first routine described above, the electric machine power is selected separately as a function of RPM bands. The initial power is calibrated to swiftly accelerate the crankshaft 26 from a stop without rocking the powertrain. The higher speed power is calibrated to quickly accelerate the crankshaft 26 through the powertrain resonance speeds. The advantage of the alternative routine is that the motor boost during the compression speed-sag is counteracted with a custom power level. The remaining functions of the launch control system are similar to that of the first routine, described in detail above.

Figure 4:
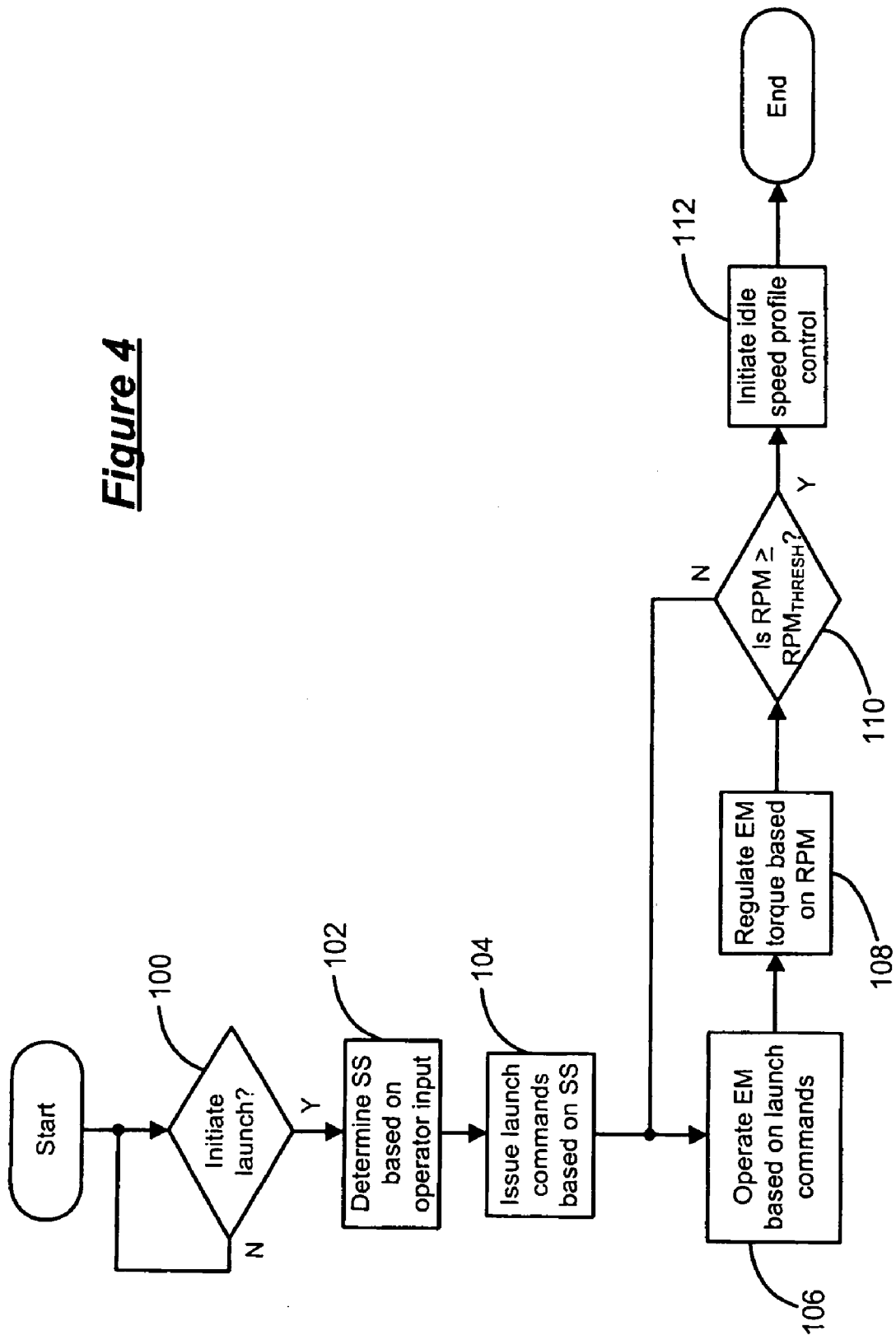
FIG. 4 is a flowchart illustrating steps performed by the launch control system according to the present invention.

Referring now to FIG. 4, the general steps executed by the launch control system of the present invention will be discussed in detail. In step 100, control determines whether to initiate launch. Launch is initiated based on the operator input, as described in detail above. If control determines not to initiate launch, control loops back. If control determines to initiate launch, control determines the start-up schedule (SS) based on the operator input in step 102. In step 104, control issues launch commands (i.e., operation mode, torque slew rate, $P_{MAX}$, etc.) based on the start-up schedule. Control operates the electric machine based on the launch commands in step 106 and regulates the electric machine torque, torque slew rate and ESD discharge power based on RPM in step 108. In step 110, control determines whether the RPM is greater than or equal to an RPM threshold ($RPM_{THRESH}$). If the RPM is not greater than or equal to $RPM_{THRESH}$, control loops back to step 106. If the RPM is greater than or equal to $RPM_{THRESH}$, control initiates idle speed control in step 112 and control ends.

The launch control system of the present invention controls electric machine torque by using torque slew rate and $P_{MAX}$ as control variables for an arbitrarily high torque request. $P_{MAX}$ can vary as based on electric machine RPM and/or based on RPM derivative. The launch control system transitions from the torque control mode to the speed control based on an electric motor RPM threshold.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed:

1. A hybrid vehicle, comprising:
   an engine having at least one cylinder;
   an electric machine that drives said engine during a start-up period;
   a control module that monitors a rotational speed of said engine and that regulates torque generated by said electric machine based on said rotational speed and a maximum discharge power available to power said electric machine during said start-up period; and
   a driver input device, wherein said control module determines said maximum discharge power based on said driver input device.

2. The hybrid vehicle of claim 1 wherein said control module determines a start-up schedule based on said driver input device and determines said maximum power based on said start-up schedule.

3. The hybrid vehicle of claim 2 wherein said start-up schedule includes a torque command and said maximum discharge power.

4. The hybrid vehicle of claim 3 wherein said start-up schedule further includes a torque slew rate command.

5. The hybrid vehicle of claim 1 wherein said driver input device includes an accelerator pedal.

6. The hybrid vehicle of claim 5 wherein said control module determines a start-up schedule based on a position of said accelerator pedal.

7. The hybrid vehicle of claim 1 wherein said driver input device includes a brake pedal.

8. The hybrid vehicle of claim 7 wherein said control module determines a start-up schedule based on a position of said brake pedal.

9. The hybrid vehicle of claim 1 wherein said control module determines said start-up schedule based on a pressure within a brake system.

10. The hybrid vehicle of claim 1 wherein said control module regulates said rotational speed based upon a desired idle speed when said rotational speed achieves a speed threshold.

11. A method of launching a hybrid vehicle from rest, comprising:
    monitoring a driver input from a drive input device;
    determining a start-up schedule based on said driver input;
    determining a maximum discharge power from said start-up schedule; and
    regulating a torque generated by an electric machine to drive an engine during a start-up period based on said maximum discharge power and a rotational speed of said engine.

12. The method of claim 11 wherein said driver input device includes an accelerator pedal and said start-up schedule is determined based on a position of said accelerator pedal.

13. The method of claim 11 wherein said driver input device includes a brake pedal and said start-up schedule is determined based on a position of said brake pedal.

14. The method of claim 13 wherein said start-up schedule is determined based on a pressure within a brake system.

15. The method of claim 11 further comprising regulating said rotational speed based upon a desired idle speed when said rotational speed achieves a speed threshold.

16. The method of claim 11 wherein said maximum discharge power is determined from said start-up schedule based on a rotational speed of said electric machine.

17. The method of claim 16 wherein said maximum discharge power is further determined from said start-up schedule based on a rate of change of said rotational speed.

18. The method of claim 11 further comprising activating a cylinder of said engine subsequent to said engine achieving an idle speed.

19. A method of spinning up an engine of a hybrid vehicle to an idle speed during a start-up period, comprising:
   determining a start-up schedule including a maximum discharge power;
   regulating a torque generated by an electric machine to drive said engine during said start-up period based on said maximum discharge power and a rotational speed of said engine;
   monitoring a driver input from a driver input device; and
   determining said start-up schedule based on said driver input.

20. The method of claim 19 wherein said driver input device includes an accelerator pedal and said start-up schedule is determined based on a position of said accelerator pedal.

21. The method of claim 19 wherein said driver input device includes a brake pedal and said start-up schedule is determined based on a position of said brake pedal.

22. The method of claim 21 wherein said start-up schedule is determined based on a pressure within a brake system.

23. The method of claim 19 further comprising regulating said rotational speed based upon a desired idle speed profile when said rotational speed achieves a speed threshold.

24. The method of claim 19 wherein said maximum discharge power is determined from said start-up schedule based on a rotational speed of said electric machine.

25. The method of claim 24 wherein said maximum discharge power is further determined from said start-up schedule based on a rate of change of said rotational speed.

26. The method of claim 19 further comprising activating a cylinder of said engine subsequent to said engine achieving an idle speed.

* * * * *